United States Patent
Ishikawa et al.

(10) Patent No.: US 8,996,213 B2
(45) Date of Patent: Mar. 31, 2015

(54) CHARGE CONTROL SYSTEM FOR ELECTRIC MOTOR VEHICLE

(75) Inventors: Akihito Ishikawa, Chita-gun (JP);
Ichiro Yoshida, Takahama (JP)

(73) Assignee: DENSO CORPORATION, Kariya (JP)

( * ) Notice: Subject to any disclaimer, the term of this patent is extended or adjusted under 35 U.S.C. 154(b) by 240 days.

(21) Appl. No.: 13/594,935

(22) Filed: Aug. 27, 2012

(65) Prior Publication Data

US 2013/0079962 A1 Mar. 28, 2013

(30) Foreign Application Priority Data

Sep. 22, 2011 (JP) ................................. 2011-207270

(51) Int. Cl.
*B60L 15/00* (2006.01)
*G06F 17/00* (2006.01)
*B60L 11/18* (2006.01)
*B60L 15/20* (2006.01)

(52) U.S. Cl.
CPC ............ *B60L 15/2045* (2013.01); *Y02T 90/168* (2013.01); *Y04S 30/12* (2013.01); *B60L 2240/68* (2013.01); *B60L 2240/70* (2013.01); *B60L 2260/52* (2013.01); *B60L 2260/54* (2013.01); *Y02T 90/16* (2013.01); *Y02T 90/161* (2013.01)
USPC ............................ 701/22; 701/29.6; 701/29.3

(58) Field of Classification Search
USPC ............ 701/22, 29.1, 29.3, 29.6; 180/65.285, 180/65.27, 65.28, 65.265, 65.21, 65.29; 340/636.1, 636.12, 636.15
See application file for complete search history.

(56) References Cited

U.S. PATENT DOCUMENTS

| | | | | |
|---|---|---|---|---|
| 6,058,350 A * | 5/2000 | Ihara | ................................. | 701/93 |
| 6,181,991 B1 * | 1/2001 | Kondo et al. | .................... | 701/22 |
| 6,864,807 B2 * | 3/2005 | Todoriki et al. | ................ | 340/988 |
| 8,155,867 B2 * | 4/2012 | Krause | ........................... | 701/123 |
| 8,504,227 B2 * | 8/2013 | Ichishi | ............................ | 701/22 |
| 2009/0299558 A1 * | 12/2009 | Hidaka | ............................ | 701/22 |

(Continued)

FOREIGN PATENT DOCUMENTS

| | | | |
|---|---|---|---|
| JP | 2001-258177 A | 9/2001 | |
| JP | 2002-296040 A | 10/2002 | |

(Continued)

OTHER PUBLICATIONS

Office Action mailed Aug. 20, 2013 in corresponding JP Application No. 2011-207270 (and English translation).
Office Action dated Jun. 26, 2014 issued in corresponding CN patent application No. 201210352154.8 (and English translation).

*Primary Examiner* — Jason Holloway
(74) *Attorney, Agent, or Firm* — Posz Law Group, PLC

(57) ABSTRACT

A charge control system for charging a battery in an electric motor vehicle includes a travel history database, a route information acquisition unit, a power consumption estimation unit, and a charge control unit. The travel history database stores data of actual travel history from a plurality of electric motor vehicles. The route information acquisition unit determines a planned travel route toward a destination specified by a user, and the power consumption estimation unit calculates an estimated power amount of the battery for the travel of the electric motor vehicle along the planned travel route. The charge control unit controls a charge of the battery based on the estimated power amount. The estimated power amount is based on data in the travel history database from a same-type vehicle as the electric motor vehicle and a same travel route as the planned travel route.

12 Claims, 5 Drawing Sheets

(56) References Cited

U.S. PATENT DOCUMENTS

| | | |
|---|---|---|
| 2010/0174484 A1* | 7/2010 | Sivasubramaniam et al. ............... 701/213 |
| 2011/0032110 A1 | 2/2011 | Taguchi |
| 2011/0057612 A1* | 3/2011 | Taguchi et al. ............... 320/109 |
| 2011/0282527 A1* | 11/2011 | Inbarajan et al. ............... 701/22 |

FOREIGN PATENT DOCUMENTS

| | | |
|---|---|---|
| JP | 2004-145727 A | 5/2004 |
| JP | 2005-098749 A | 4/2005 |
| JP | 2008-044442 A | 2/2008 |
| JP | A-2010-286400 | 12/2010 |
| JP | 2011-091894 A | 5/2011 |

* cited by examiner

CHARGE CONTROL SYSTEM FOR ELECTRIC MOTOR VEHICLE

CROSS REFERENCE TO RELATED APPLICATION

The present application is based on and claims the benefit of priority of Japanese Patent Application No. 2011-207270, filed on Sep. 22, 2011, the disclosure of which is incorporated herein by reference.

TECHNICAL FIELD

The present disclosure generally relates to a charge control system of an electric vehicle to control a charge of a battery of the electric vehicle.

BACKGROUND

Electric motor vehicles including electric and hybrid vehicles that use a battery as a primary or secondary power source may have the battery charged regularly by, for example, a charge facility or an outlet power at home. The cruising range (i.e., a continuously travelable distance) of the electric motor vehicle is generally shorter than the cruising range of a gasoline engine vehicle. In addition, the time needed to re-charge the electric motor vehicle may take longer time than re-fueling the gasoline engine vehicle. Therefore, a user of the electric motor vehicle may be concerned about whether he/she will be able to reach a destination of travel without suffering from electric power shortage or whether he/she may miss an appointment due to re-charging.

Based on Japanese Patent Laid-Open No. 2010-286400 (JP '400), a navigation apparatus in the electric vehicle searches for a guidance route to the destination, predicts the travel time of the guidance route as well as the power consumption by the vehicular devices such as a headlamp and the like, and calculates/displays a travelable distance based on the currently-remaining amount of battery. Further, if it is determined that the currently-remaining amount of battery does not allow the vehicle to reach the destination, the navigation apparatus searches for a charge facility within the reach (i.e., the travelable distance), and notifies the driver of the searched facility.

In addition, excessive charging of the battery to have a more-than a required power amount is not only undesirable but is also harmful, in terms of charge, for example, cost and charge time. Thus, an accurate estimation of the amount of electric power needed in the battery is important.

Factors affecting the amount of power consumption include, for instance, a slope of a road. That is, an uphill slope may substantially increase the battery consumption than a downhill slope for the same distance of travel. However, in the disclosure of JP '400, an estimation of the battery power consumption does not consider the slope of the road in the course of estimating the battery power consumption for the guidance route, thereby not enabling the accurate calculation of the amount of electric power needed. If the road map data include a highly accurate slope data, the accurate calculation of the amount of electric power of the battery may be possible. However, the cost and time for preparing such data may be significantly large and may not be feasible.

Further, besides the slope of the road, other factors such as a vehicle weight may also affect the battery power consumption. That is, even when the vehicle is the same, the number of occupants and/or the weight of the load lead to the change of the total weight of the vehicle, thereby affecting the battery power consumption for the same route. Conventionally, such a change due to the total weight of the vehicle has not been considered.

SUMMARY

It is an object of the present disclosure to provide a charge control system of the electric motor vehicle that calculates battery power consumption highly accurately when the vehicle travels a planned travel route toward a destination, enabling a suitable charge of the battery for various occasions.

In an aspect of the present disclosure, the charge control system includes: a travel history database, a route information acquisition unit, a power consumption estimation unit, and a charge control unit. The travel history database accumulatively stores data of actual travel history from a plurality of electric motor vehicles. The data may include a vehicle type, a travel route, and an estimated power amount for the travel route. The route information acquisition unit acquires information of a planned travel route towards a destination specified by a user.

The power consumption estimation unit calculates an estimated power amount of the battery for the travel of the electric motor vehicle along the planned travel route, and the charge control unit controls a charge of the battery based on the estimated power amount. The estimated power amount is based on data from a same-type vehicle as the electric motor vehicle and a same travel route as the planned travel route, which is stored in the travel history database.

According to the charge control system, the travel history database accumulatively stores the travel history data from actual travels of many vehicles, which includes data regarding the vehicle types, travel routes, and the amount of electric power used by the vehicle for the travel route that was actually traveled. Based on the planned travel route toward the user-specified destination from the route information acquisition unit, the power consumption estimation unit calculates the estimated power amount of the battery for the travel of the vehicle along the planned travel route. In the course of such calculation, the power consumption estimation unit searches the travel history database for data of the same-type electric vehicle along the same travel route as the planned travel route, and calculates the estimated power amount based on the searched data. The charge control unit then performs a charge control for charging the electric power to the battery by the amount that is sufficient for the travel to the destination, which is based on the estimated power amount.

The power consumption estimation unit searches the travel history database to calculate the estimated power amount. Since the travel history data is an actual travel of the electric motor vehicle, that is, since the data implicitly includes the slope of the road, the estimated power amount required for the travel of the route is more accurately estimated. Further, the road map data needs not be equipped with the accurately prepared road slope data. Therefore, according to the above configuration, the estimated power amount of the battery for the travel of the electric motor vehicle along the planned travel route can be accurately estimated, thereby enabling the proper charging of the battery.

An estimation of the estimated power amount may be affected by the slope of the road. The present disclosure uses the road map data that represents roads as combinations of nodes and road links, for organizing and storing the information of the travel route in the travel history database, allowing the identification of the start node, the end node, and the road link in between and diminishing the ambiguity or the error of the travel direction of the vehicle on the road, thereby enabling an accurate estimation of the estimated power amount.

BRIEF DESCRIPTION OF THE DRAWINGS

Other objects, features and advantages of the present disclosure will become more apparent from the following detailed description disposed with reference to the accompanying drawings, in which.

DETAILED DESCRIPTION (1) First Embodiment

Figure 1:
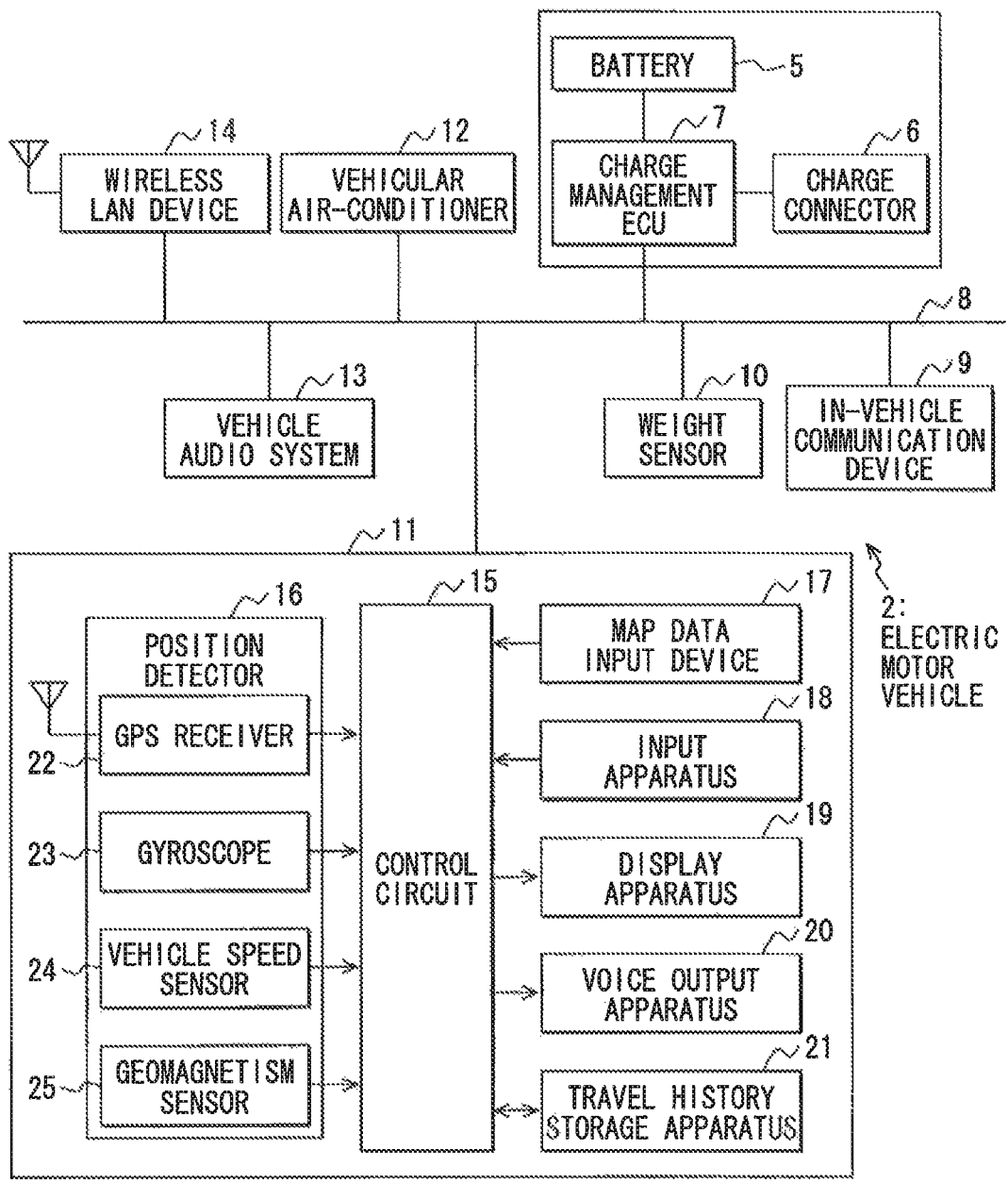
FIG. 1 is a block diagram of a vehicle of a charge control system in a first embodiment.
Figure 2:
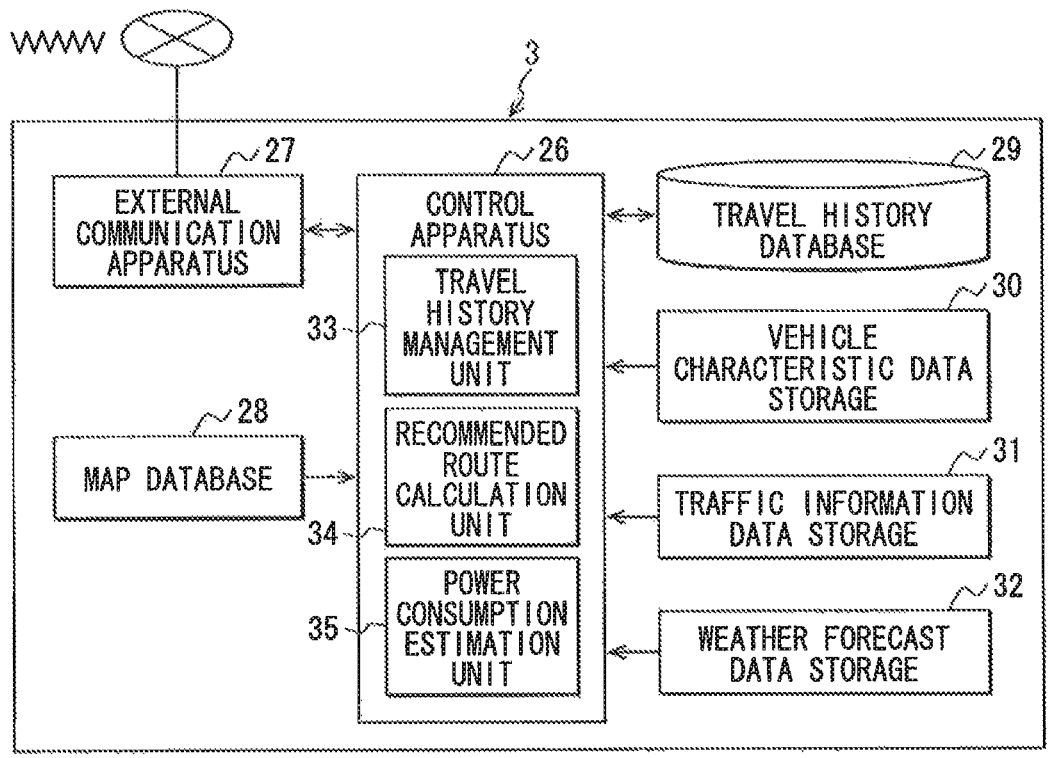
FIG. 2 is a block diagram of an information center of the charge control system in the first embodiment.
Figure 3:
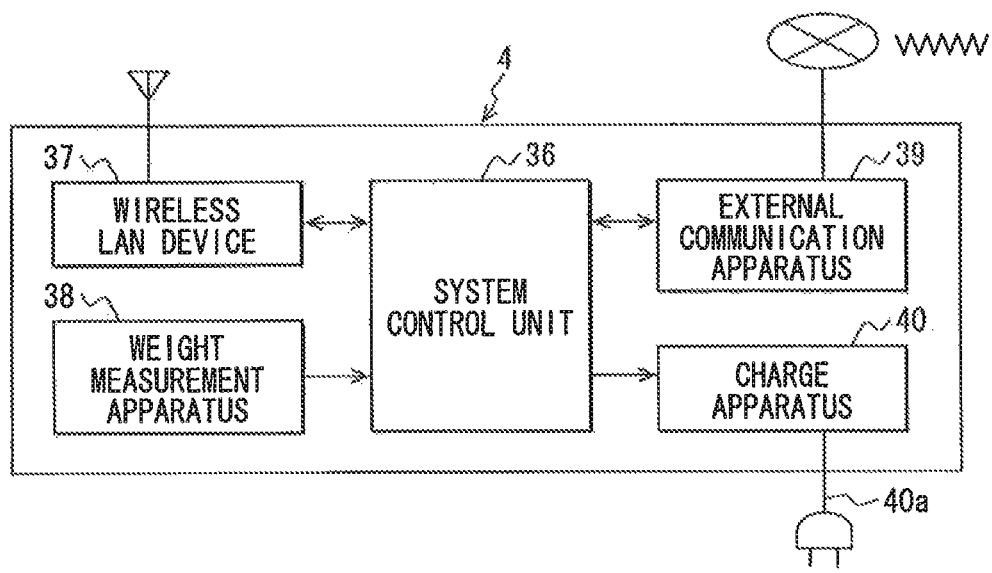
FIG. 3 is a block diagram of a charge station of the charge control system in the first embodiment.
Figure 4:
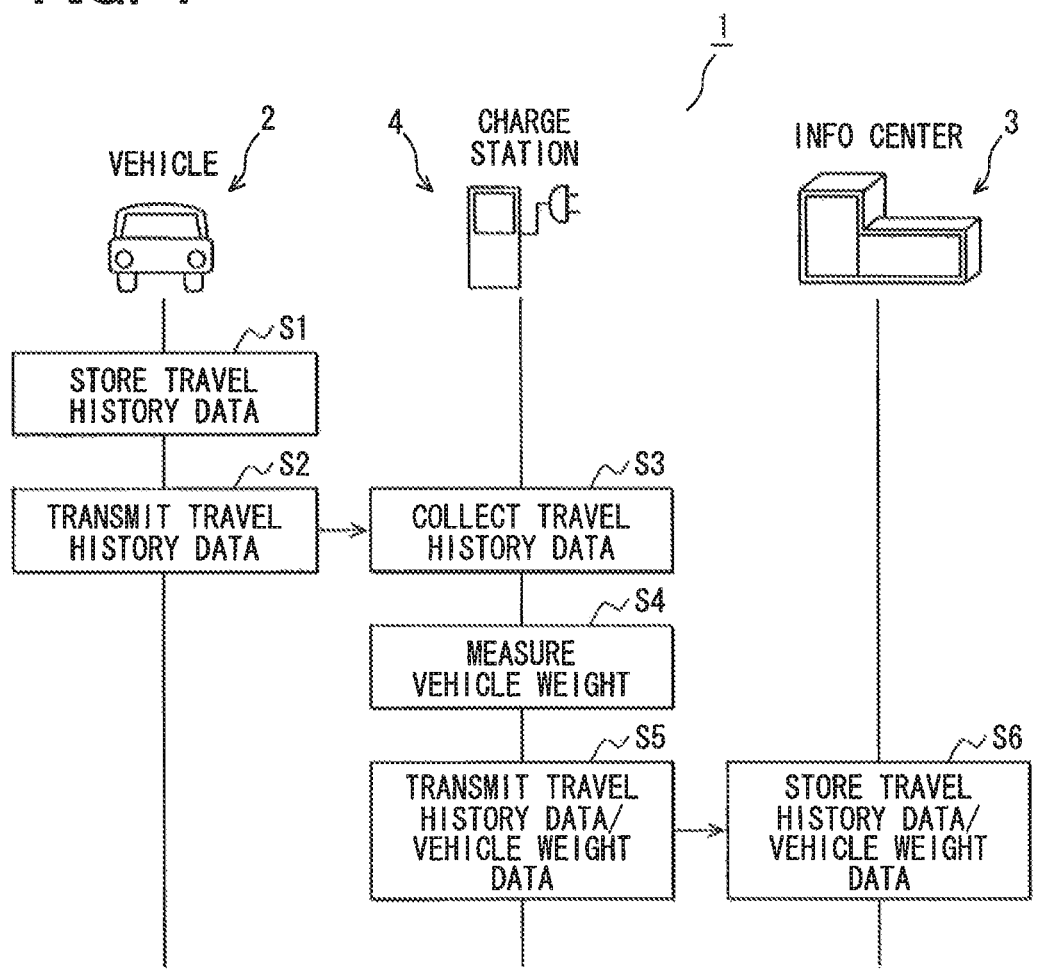
FIG. 4 is a sequence chart regarding communication and processing of collecting travel history data.

The first embodiment of the present disclosure is described with reference to FIGS. 1 to 5. With reference to FIG. 4, a charge control system 1 of the present disclosure includes an electric motor vehicle 2 (i.e., simply a vehicle 2 hereinafter), which is an electric vehicle, an information center 3 (e.g., a navigation center), and a charge station 4. FIGS. 1, 2, 3 respectively show a configuration of vehicle 2, the information center 3, and the charge station 4.

With reference to FIG. 1, the vehicle 2 includes a motor (not illustrated) for a travel of the vehicle 2, or as a rotation power source for rotating tires. Further, it is equipped with a battery 5, such as lithium ion secondary batteries, serving as a power source of the motor and other vehicular devices. The body of the vehicle 2 has a charge connector 6 (i.e., a charge plug mouth) disposed thereon. The charge connector 6 may be detachably connected to an external power source such as a charger at the charge station 4, or a home power outlet through a charge cable, allowing the charging of the battery 5. The charging of the battery 5 is performed and controlled by a charge management ECU 7.

To control the charging, an in-vehicle LAN 8, such as a CAN (Controller Area Network), in the vehicle 2 provides a connection to the charge management ECU 7, for example. Further, the in-vehicle LAN 8 is also coupled to an in-vehicle communication device 9 for wireless communication with a device external of the vehicle 2, a weight sensor 10, a navigation apparatus 11, a vehicular air-conditioner 12, a vehicle audio system 13, and a wireless LAN device 14.

The in-vehicle communication device 9 may be, for example, a data communication module (DCM) for performing data communication with the information center 3 and for receiving the latest traffic information (i.e., information such as a traffic jam, an accident, construction, traffic lane control traffic regulation), as well as for receiving weather information such as current weather, wind direction, from a meteorological agency. The weight sensor 10 may include an air pressure sensor for gauging tire pressure and a seating sensor for detecting the number of vehicle occupants and/or the weight of the load in the vehicle. The weight sensor 10 may be provided as a weight determination unit in claims The navigation apparatus 11 includes a control circuit 15, implemented as a computer, for performing various navigation processes, and the control circuit 15 is coupled to a position detector 16 for determining a position of a subject vehicle, a map data input device 17 for inputting map data, an input apparatus 18, a display apparatus 19 such as a liquid crystal display, a voice output apparatus 20, and a travel history storage apparatus 21 having a hard disk drive or the like.

The position detector 16 includes a Global Positioning System (GPS) receiver 22 for providing a position of the vehicle 2 based on GPS signal from satellites, a gyroscope 23 detecting the angle of rotation speed of the vehicle 2, a vehicle speed sensor 24, and a geomagnetism sensor 25, all of which are well known. The control circuit 15 determines, based on the inputs from the above-described sensors in the position detector 16, the current position (i.e., an absolute position) of the vehicle 2, as well as a travel direction, a speed, a travel distance, and a current time with high accuracy.

Based on the current position of the vehicle 2 and the map data from the map data input device 17, which may be designated as a location function, the control circuit 15 displays the current position of the vehicle 2 together with other map features, such as a road and a travel direction of the vehicle 2, on the display apparatus 19. In this case, the location function of the control circuit 15 may be more practically realized by matching the vehicle 2 position onto a road in the map data, or, by using a so-called map matching, which is based on the comparison between the travel locus of the vehicle and the road shape in the map data, estimating a road on which the vehicle is traveling.

The map data input device 17 reads data from a data medium such as a DVD-ROM, a CD-ROM or the like, which stores road maps with various features such as shops and other facilities. The road map defines roads on the map, dividing a road into segments by using nodes and links, which respectively correspond to intersections and the roads between the intersections. The link is represented by link data, including a link ID (i.e., a unique identifier), a link length, a link start/end point, which is a node, position data (i.e., longitude/latitude), angle (i.e., direction) data, data regarding a road width, and a road type. The data may further include display data for drawing a road map on the screen of the display apparatus 19.

The input apparatus 18 is a device for accepting a user operation or input, and includes a touch panel on the screen of the display apparatus 19, and mechanical switches around the display apparatus 19, and may further include vehicular operation mechanisms, such as buttons, on, for example, the steering wheel or the center console. By using those switches and buttons, the user can input various instructions and settings, such as a destination of travel, from the input apparatus 18.

The navigation apparatus 11 (i.e., the control circuit 15) realizes a route guidance function for guiding a route toward a destination (i.e., a planned travel route) that is recommended based on route guidance data. As is generally known, the route guidance may be provided as a route display for highlighting a guidance route on the map that is displayed on the screen of the display apparatus 19, together with a voice output from the voice output apparatus 20, guiding a turning point or the like when the vehicle reaches a preset guidance point.

In the present embodiment, the route guidance data is calculated by a server in the information center 3 (i.e., a route search is performed in the information center 3), and is received by the navigation apparatus 11 through communication with the charge station 4, which is equipped with the wireless LAN device 14 for transmitting such data. Alternatively, such data may be transmitted through communication by using the in-vehicle communication device 9 for reception directly from the information center 3. Further, the control circuit 15 may, by itself, calculate the recommended route by using a method, such as a well-known Dijkstra method.

The travel history storage apparatus 21 stores the travel history data that is written by the control circuit 15, which is based on the actual travel of the vehicle in the past. The travel history data is, therefore, the accumulated memory of the past travel. That is, for example, the travel history data may include link information of the traveled route, which is formed as a data set of a road link, a start node, an end node, as well as speed information indicative of the vehicle speed (i.e., acceleration, deceleration, braking and the like) in each link and information, such as a power consumption of the battery 5 in each link, a travel time and day, the weight of the vehicle 2.

In this case, the power consumption information is stored as a net consumption of electric power only by the travel of the vehicle, that is, the power consumed by the motor of the vehicle, thereby excluding the power consumption by the vehicular devices such as the air-conditioner 12, the vehicle audio system 13, the headlamp, the wiper and the like, from the total power consumption.

In case the travel of the vehicle is put in an exceptional condition, that is, a traffic congestion due to constructions and/or accidents, a heavy snow or a snow storm, for example, such a travel may be removed from the travel history data, or the data may be supplemented with a note indicating the exceptional condition. As described later, the travel history data stored in the travel history storage apparatus 21 is transmitted to the charge station 4 via the wireless LAN device 14.

With reference to FIG. 2, the information center 3 includes a control apparatus 26 (i.e., a server), which is implemented as a computer, for controlling the entire system. The control apparatus 26 is coupled to an external communication apparatus 27, a map database 28, a travel history database 29, a vehicle characteristic data storage 30, a traffic information data storage 31, and a weather forecast data storage 32.

The external communication apparatus 27 functions as a data communication unit for having communication with the charge station 4 through the Internet. By using the external communication apparatus 27, the latest traffic information, such as possible traffic congestion and planned constructions, may be acquired from the traffic information center, and the latest weather information, such as weather forecast and temperature, may be acquired from the meteorology agency. The acquired traffic information is stored in the traffic information data storage 31 and the acquired weather information is stored in the weather forecast data storage 32. Therefore, a travel environment information acquisition unit may include the external communication apparatus 27, the control apparatus 26, the traffic information data storage 31, and the weather forecast data storage 32.

The map database 28 stores a road map data for route search and the travel history database 29 accumulatively stores a travel history data transmitted from other vehicles from the charge station 4. The travel history data includes a user ID and a vehicle ID, as well as a vehicle type (including engine displacement for a hybrid vehicle), a travel route (i.e., road link information), and information regarding power consumption by the travel of the travel route. The vehicle characteristic data storage 30 stores data of the characteristic of the vehicle 2 according to the vehicle type.

The control apparatus 26 may serve as a travel history management unit 33, a recommended route calculation unit 34, and a power consumption estimation unit 35. The travel history management unit 33 accumulatively stores the travel history data transmitted from the charge station 4 to the travel history database 29 in a manner classified according to a vehicle type. Further, the recommended route calculation unit 34 calculates, i.e., searches for a recommended route (i.e., a planned travel route) toward the destination by using a well-known Dijkstra method based on the current position and the destination of the vehicle 2 transmitted via the charge station 4. The recommended route calculation unit 34 may be provided as a route information acquisition unit.

The power consumption estimation unit 35 calculates an estimated power amount, where the estimated power amount is the amount of electric power or electric charge of the battery 5 that may be used when the vehicle 2 travels the recommended route (i.e., a planned travel route) from the current position to the destination. At the time of calculating the estimated power amount, the power consumption estimation unit 35 searches the travel history database 29 for data of a required power amount, which is the amount of electric power or electric charge used by the same type of vehicle as the vehicle 2 during a travel of the same travel route. In other words, the required power amount is the amount of power used by a similar vehicle as the vehicle 2 along the planned travel route of the vehicle 2.

Further, the power consumption estimation unit 35 (i.e., the control apparatus 26) in the present embodiment considers the weight information of the vehicle 2 transmitted from the charge station 4, in the course of calculating the estimated power amount for correcting such amount. For example, the heavier-than-standard weight of the vehicle 2 leads to an increase of the estimated power amount.

Furthermore, the power consumption estimation unit 35 (i.e., the control apparatus 26) acquires data of the travel environment regarding the planned travel route to be traveled by the vehicle 2 from the traffic information data storage 31 and the weather forecast data storage 32, and corrects the estimated power amount according to the travel environment. For example, for traveling at night, the power consumption by the headlamp may be considered; for traveling in a hot season, the power consumption by the air-conditioner 12 may be considered; and for traveling in rain the power consumption for operating the wiper may be considered. Therefore, the power consumption estimation unit 35 (i.e., the control apparatus 26) may serve as a first correction unit and a second correction unit.

With reference to FIG. 3, the charge station 4 includes a system control unit 36, which is implemented as a computer, for controlling the entire system. In addition the charge station 4 includes, which are coupled to the system control unit 36, a wireless LAN device 37 serving as a communication connection unit for communication with the vehicle 2, a weight measurement apparatus 38 for detecting an actual weight of the vehicle 2 (i.e., vehicle only not the load/passengers), an external communication apparatus 39 serving as a data communication unit for performing data communication with the information center 3, and a charge apparatus 40 serving as an external power source.

The wireless LAN device 37 performs a short range wireless communication to the wireless LAN device 14 of the vehicle 2, and, through such communication, data of the destination and the travel history data are transmitted from the vehicle 2. Further, the data such as a travel route and the like may also be transmitted to the vehicle 2 through such communication.

The external communication apparatus 39 performs, for example, data communication with the external communication apparatus 27 of the information center 3 through the Internet. In this case, from the charge station 4 side, the travel history data collected from the vehicle 2 are transmitted to the information center 3, together with data regarding the vehicle type of the vehicle 2 and the destination and the current position. Further, from the information center 3, data regarding the estimated power amount are transmitted together with data regarding the recommended travel route.

The charge apparatus 40 is coupled to the charge connector 6 of the vehicle 2 through a charge cable 40a, and charges the battery 5 of the vehicle 2. At the time of charging, the system control unit 36 determines a charge power amount of the battery 5, based on the remaining power amount (i.e., state of charge (SOC)) of the battery 5 and the estimated power amount acquired from the information center 3, so that the vehicle 2 may reach the destination with some charge still remaining in the battery 5 (i.e., a margin power amount). For instance, if the estimated power amount is designated as "A," the remaining power amount is "B," and the margin power amount is "C," the charge amount described above is equal to (A+C−B). The system control unit 36 controls the charging by the charge apparatus 40, and, therefore, the system control unit 36 and the charge apparatus 40 in combination may serve as a charge control unit.

The operation of the charge control system 1 in the present embodiment having the above-described configuration is described with reference to FIG. 4 and FIG. 5.

A sequence chart in FIG. 4 illustrates a flow of the communication process regarding a collection of travel history data by the system 1, which includes the vehicle 2 (i.e., the control circuit 15 of the navigation apparatus 11 in particular), the charge station 4 (i.e., the system control unit 36), and the information center 3 (i.e., the control apparatus 26).

As the vehicle 2 travels, the travel history data based on an actual travel of the vehicle 2 is continuously written to the travel history storage apparatus 21 by the control circuit 15 of the navigation apparatus 11 (S1). The travel history data includes the vehicle type and the ID of the vehicle 2, as well as link information of the traveled route (i.e., data collectively representing a road link, a start node, and an end node), the amount of power consumption of the battery 5 consumed by the motor at each road link, information of the weight of the vehicle 2 determined by the weight sensor 10. The amount of power consumption may be stored as a converted value, which standardized the weight of the vehicle 2 to have a standard value.

When the vehicle 2 is at the charge station 4 for charging the battery 5, communication between the wireless LAN device 14 of the vehicle 2 and the wireless LAN device 37 of the charge station 4 is established and performed. The travel history data stored in the travel history storage apparatus 21 is transmitted to the charge station 4 (step S2).

Further, after the transmission of the data from the vehicle 2 to the charge station 4, the travel history data determined as unnecessary is deleted from the travel history storage apparatus 21 of the vehicle 2. A communication transfer history (i.e., a log history) regarding the transfer of the travel history data through the above communication and the deletion of the data is kept undeleted.

When the travel history data transmitted from the vehicle 2 is received by the charge station 4 (S3), the weight measurement apparatus 38 of the charge station 4 measures the weight of the vehicle 2 (S4). The weight data of the vehicle 2 measured by the weight measurement apparatus 38 is transmitted with the travel history data received by the external communication apparatus 39 from the charge station 4 to the information center 3 (i.e., the external communication apparatus 27) (S5).

Upon receiving the weight data and the travel history data by the external communication apparatus 27, the travel history management unit 33 of the control apparatus 26 of the information center 3 controls the data to be accumulatively stored to the travel history database 29 (S6). In this manner, the travel history data of many vehicles 2 are accumulatively stored in the travel history database 29 of the information center 3 as data of the actual travels of the vehicles 2.

Since the travel history data, which is accumulated stored, includes the vehicle type, road links, and the amount of power consumption, a calculation of an estimated power amount is enabled based on such data. In the present system, the user of the vehicle 2 providing the travel history data may in exchange receive a price deduction point or a service point as the benefit from providing such data.

Further, when the actual weight of the vehicle 2 is measured at the charge station 4 in S4, the error of the weight sensor 10 in the vehicle 2 may be corrected, for a more accurate measurement of the weight of the vehicle 2. Further, the control apparatus 26 (i.e., the travel history management unit 33) also stores the communication transfer history (i.e., a log history) of transfer of the travel history data. In such manner, the user of the vehicle 2 may be able to read the travel history data from the travel history database 29 and to confirm the data regarding the past travel of the vehicle.

Furthermore, when the travel history data is stored to the travel history database 29 of the information center 3, the setting of the road link of the data from the vehicle 2 may be different from the setting of the information center 3, i.e., the setting of the road map data. In such a case, the road link information from the vehicle 2 is re-configured to be consistent with the road map data in the map database 28. Further, when the information of the recommended travel route is transmitted to the vehicle 2, such information is re-configured to be consistent with the road map data on the vehicle 2. In the present system, the user of the vehicle 2 providing the travel history data may in exchange receive a price deduction point or a service point as a benefit for providing the data.

Figure 5:
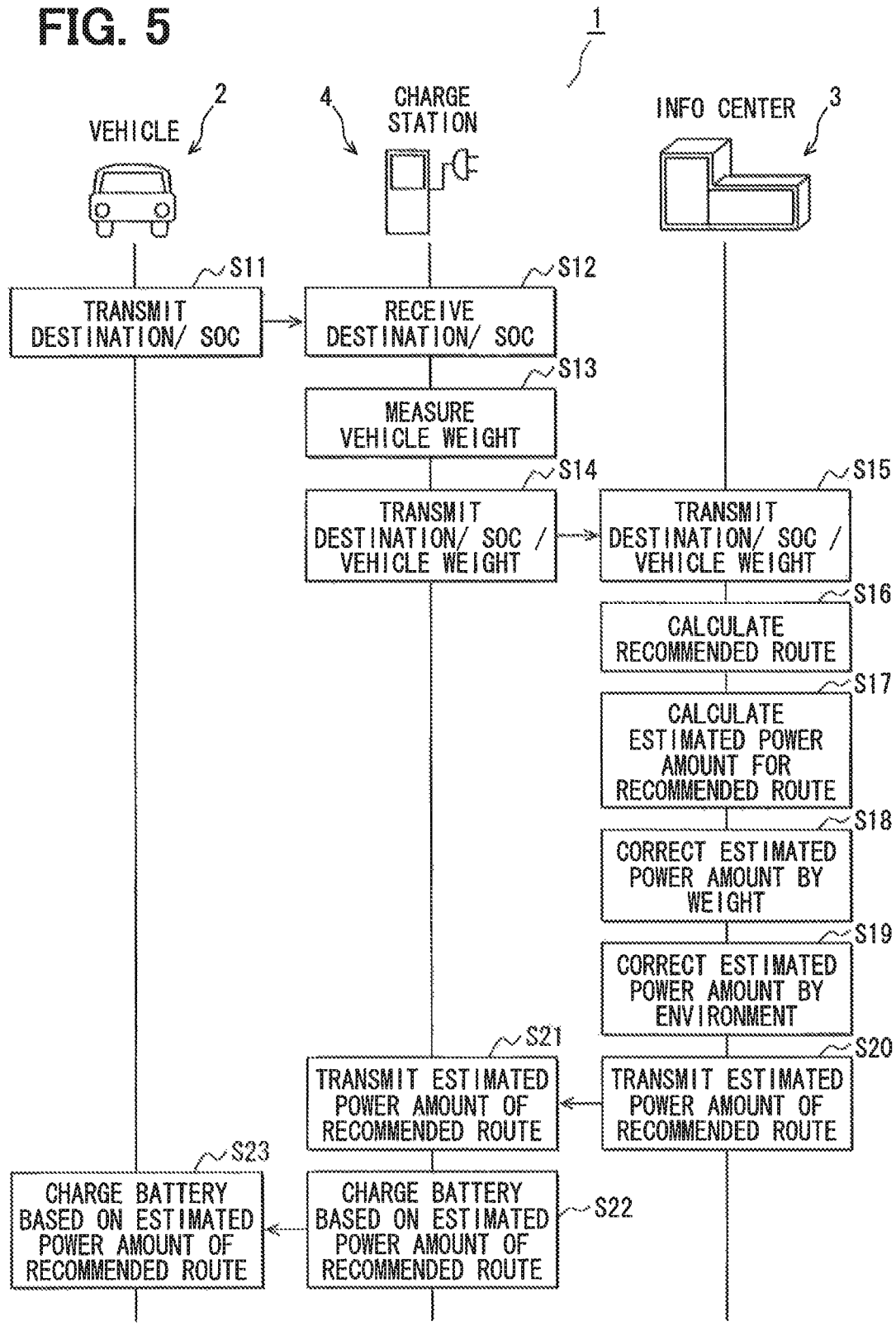
FIG. 5 is a sequence chart regarding communication and processing of an estimated power amount and charge control.

FIG. 5 is a sequence chart of a process regarding a calculation of a estimated power amount and a charge control by the charge control system 1, which includes the vehicle 2 (i.e., the control circuit 15 of the navigation apparatus 11), the charge station 4 (i.e., the system control unit 36), and the information center 3 (i.e., the control apparatus 26).

The vehicle 2 arrives as the charge station 4 for charging the battery 5 with the destination set according to the user operation of the input apparatus 18. In S11, communication is established and performed between the wireless LAN device 14 of the vehicle 2 and the wireless LAN device 37 of the charge station 4, and the destination data and the data regarding the remaining power amount of the battery 5 (SOC in drawings) in addition to the data regarding the vehicle type is transmitted from the vehicle 2 to the charge station 4.

The charge station 4 receives the destination data and the data regarding the remaining power amount of the battery 5 from the vehicle 2 (S12), and the weight measurement apparatus 38 determines the weight of the vehicle 2 (S13). Further, data of the vehicle type, the destination, the remaining power amount of the battery 5, and the weight of the vehicle 2 are transmitted by the external communication apparatus 39 from the charge station 4 to the information center 3 (i.e., the external communication apparatus 27) (S14).

Upon receiving data of the vehicle type, the destination, the remaining power amount of the battery 5, and the weight of the vehicle 2 by the external communication apparatus 27 (S15), the recommended route calculation unit 34 of the control apparatus 26 determines (i.e., searches for) a recommended travel route from the current position of the vehicle 2 (i.e., the position of the charge station 4) to the destination by using a normal method, such as Dijkstra method, (S16). The power consumption estimation unit 35 of the control apparatus 26 calculates the estimated power amount of the battery 5 for the travel of the recommended route (S17).

For the calculation of the estimated power amount, the power consumption estimation unit 35 searches the travel history data of the travel history database 29 for the data of the power consumption on the same travel route (i.e., the series of the road links) by the same type vehicle as the vehicle 2 (i.e., searches for a required power amount), and calculates the estimated power amount for the travel of such route (i.e., A+C−B).

During the search of the database 29 for the travel history data, the searched data includes the slope of the road since the data in the database 29 is based on the actual travel of many electric motor vehicles 2. That is, calculation of the estimated power amount for the travel of the planned route based on the searched data of the database 29 can more accurately estimate the estimated power amount in comparison to the calculation for the same route based on predetermined data of the vehicle types or the like.

Further, since information regarding the travel route (i.e., road links) stored in the travel history database 29 is organized based on the road map data that represents a road as a combination of the nodes and links, which enables a representation of the travel route by specifically identifying a start node, an end node, and a road link of the travel route and the planned route, the ambiguity (i.e., an error) of the travel direction of the route is diminished, thereby enabling a secure calculation of the estimated power amount for the travel route. Further, the data of the estimated power amount regarding one road link may be calculated as statistics of many data such as an average, a median or the like if the data of one road link is collected from many vehicles of the same-type.

The estimated power amount calculated is corrected based on the data of the weight of the vehicle 2 (S18). A vehicle of the same type as the vehicle 2 may have different estimated power amounts for the same road, since the amount of the load and the number of the occupants may differ vehicle to vehicle. Therefore, the correction is performed for a fine-tuned and accurate calculation of the estimated power amount.

The estimated power amount is then corrected according to the travel environment of the vehicle 2 (S19). In this case, the correction according to the travel environment may include, for example, power used by a headlamp of the vehicle 2 for traveling at night or the use of the wiper for traveling in the rain or the use of the air-conditioner 12 when the external temperature during hot seasons. The operation of such devices may be considered as a factor for increasing the estimated power amount. Further, the traffic congestion in the planned travel route may also contribute to the increase of the estimated power amount of the battery 5. Therefore, the correction is performed for further fine-tuning and accurately calculating the estimated power amount.

Data of the recommended travel route (i.e., the planned travel route) as well as data of the estimated power amount for the recommended travel route are transmitted to the charge station 4 (i.e., the external communication apparatus 39) by the external communication apparatus 27 (S20). Upon receiving the data of the recommended travel route and the estimated power amount by the external communication apparatus 39 (S21), the wireless LAN device 37 of the charge station 4 transmits the data of the recommended travel route to the vehicle 2 (i.e., to the wireless LAN device 14), and the charge apparatus 40 performs charging of the battery 5 of the vehicle 2 (S22) based on the estimated power amount.

The charging of the battery 5 in the vehicle 2 is performed according to the estimated power amounted determined (S23). The amount of charged power by the charge apparatus 40 is represented as (A+C−B) if the estimated power amount, the remaining power amount in the battery 5, and the margin power amount are respectively represented as A, B, and C. In such manner, the battery 5 is charged to have the amount that is sufficient for the travel to the destination plus the amount of margin power amount. Route guidance is performed for guiding the vehicle 2 to the destination based on the received data regarding the recommended route.

According to the charge control system 1 of the present embodiment, the system 1 has the travel history database 29 storing the travel history data of many vehicles 2 in the information center 3, and estimates the estimated power amount of the battery 5 for the travel of the planned travel route by the vehicle 2, based on data in the travel history database 29 for the same-type of vehicle as the vehicle 2 and for the same travel route as the planned travel route. In this manner, the estimated power amount for the travel of the planned travel route is accurately estimated in consideration of the slope of the planned travel route without preparing road slope data in the road map data.

As a result, the estimated power amount of the battery 5, which may be needed for the travel of the electric motor vehicle 2 to the destination of the planned travel route, is accurately estimated. Further, the battery 5 is charged to the estimated power amount with the margin power amount that serves as an allowance power, thereby reducing the time and cost for charging the battery 5 to an appropriate and/or economical level. In addition the estimated power amount further takes into consideration the weight of the vehicle 2 and the travel environment, which further improves the accuracy of the estimated power amount.

By including the charge station 4 and having the charge station 4 between the vehicle 2 and the information center 3, data communication is efficiently performed with many electric motor vehicles 2 for collecting the travel history data from those vehicles and for other purposes. Further, since the charge station 4 is equipped with the weight measurement apparatus 38, the weight of the vehicle 2 is objectively and accurately measured.

Figure 6:
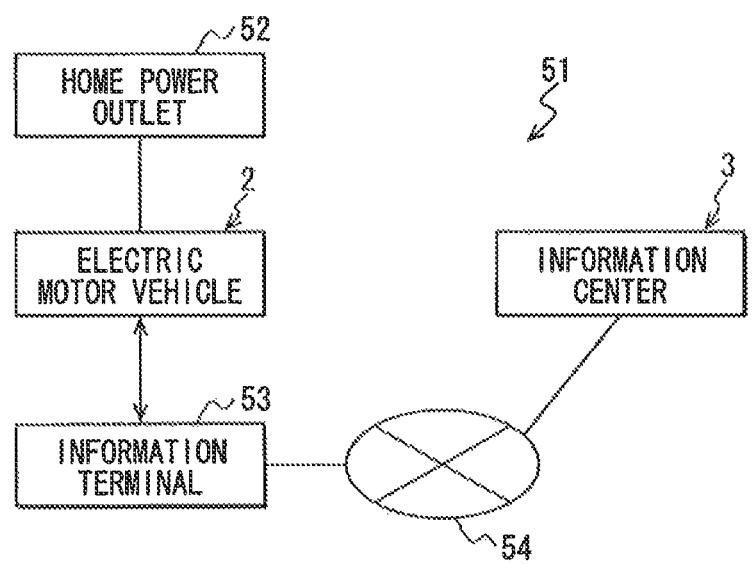
FIG. 6 is a block diagram of a charge control system in a second embodiment of the present disclosure.

(2) Second Embodiment is FIG. 6 shows a block diagram of a charge control system 51 of the second embodiment of the present disclosure. The following description provides the differences between the first and second embodiment, which is mainly the power source for charging the battery 5. Specifically, the external power source for charging the battery 5 of the vehicle 2 is a home power outlet 52, and not the charge station 4. The vehicle 2 has an information terminal 53, such as a personal computer, a cellular phone, or a smart phone, coupled thereto through a wireless connection or a wired connection, and the vehicle 2 is configured to perform data communication with the information center 3 through the Internet 54 by using the information terminal 53.

By transmitting the travel history data stored in the travel history storage apparatus 21 of the vehicle 2 to the information center 3 through the information terminal 53, the travel history database 29 of the information center 3 can accumulatively store the transmitted data from many vehicles 2.

Upon receiving an input of, for example, the next day's travel plan, such as a departure time from home or the destination by operating the information terminal 53, the inputted data is transmitted from the information terminal 53 to the information center 3.

The information center 3 determines a recommended travel route (i.e., a planned travel route) from the departure place (i.e., from home) to the input destination, and determines the estimated power amount for traveling the planned travel route based on data from same-type of vehicles as vehicle 2 stored in the travel history database 29 and for the same travel route as the planned travel route. The recommended travel route and the estimated power amount are transmitted from the information center 3 to the information terminal 53, and, the battery 5 of the vehicle 2 can be charged based on the estimated power amount by using, for example, a midnight electric power that has a cheaper rate.

According to the second embodiment of the present disclosure, the system has the travel history database 29 storing the travel history data of many vehicles 2 in the information center 3, and determines an estimation of the estimated power amount of the battery 5 for the travel of the planned travel route by the vehicle 2, based on data in the travel history database 29 from the same-type of vehicle as the vehicle 2 and for the same travel route as the planned travel route, just like the system in the first embodiment. In this manner, the estimated power amount for the travel of the planned travel route is accurately estimated in consideration of the slope of the planned travel route without preparing the road slope data in the road map data. As a result, the estimated power amount of the battery 5 for traveling along the planned travel route is accurately estimated, and the battery 5 is appropriately charged to store the required and sufficient power amount for the travel to the destination.

Other Embodiments

Further, though it is not illustrated, the present disclosure may be modified in the following manners. Though the system in the first embodiment has the first correction unit for correcting the estimated power amount according to the weight of the vehicle and the second correction unit for correcting the estimated power amount according to the travel environment, the system may further have a third correction unit for correcting the estimated power amount based on a determination of use frequency of a vehicular device that is used by the user depending on the user preference, which may be, for example, the vehicle audio system 13. In such manner, the use frequency of the vehicle audio system 13 that is used according to the user preference may be reflected in the estimation of the estimated power amount, thereby increasing the accuracy of the estimated power amount of the battery 5.

Further, in the present disclosure, the travel history data in the travel history database 29 may be used for other purposes other than estimating the estimated power amount. For example, a fuel mileage information disclosure unit for disclosing a "fuel mileage" or the averaged power amount requirement for a vehicle type may be provided and operated based on the data in the travel history database 29. Thus, according to the fuel mileage information disclosure unit, the trend (i.e., merits and demerits) of the fuel mileage for each of the vehicle types is clearly provided. Such disclosure can be used by the user as an indication for determining the purchase/replacement or a rental of the vehicle 2.

Based on the travel history data from each user of the travel history database 29, the system may provide a driving characteristic determination unit for determining the driving characteristic of each of the users. In such manner, the user can objectively recognize if his/her own driving characteristics yields a good "fuel mileage," thereby leading to the improvement of the driving technique.

Further, the system may provide an abnormality determination unit for determining and notifying the user of an abnormality of the vehicle 2. For instance, a estimated power amount that is poor or abnormal (i.e., an abnormally bad "fuel mileage") may be determined as an abnormality (i.e., a trouble) of some kind in the vehicle 2. In such manner, the travel history database 29 may be utilized for establishing the advantageous features of the system 1.

Further, the present disclosure may also be applied to a plug-in hybrid vehicle that permits charging the batter from an external power source.

Such changes and modifications are to be understood as being within the scope of the present disclosure as defined by the appended claims.

Based on the embodiments above, an estimation of the estimated power amount may be affected by the slope of the road. The present disclosure uses the road map data that represents roads as combinations of nodes and road links, for organizing and storing the information of the travel route in the travel history database, allowing the identification of the start node, the end node, and the road link in between and diminishing the ambiguity or the error of the travel direction of the vehicle on the road, thereby enabling an accurate estimation of the estimated power amount.

Another factor for determining the estimated power amount may include the weight of the vehicle. Specifically, the estimated power amount for the same vehicle type and for the same travel route may be changed if the weight of the vehicle is different. In the present disclosure, a weight determination unit determines a weight of the electric motor vehicle when the electric motor vehicle travels the planned travel route and a first correction unit corrects the estimated power amount based on the weight determined by the weight determination unit are provided, thereby improving the accuracy of the estimated power amount.

Further, the travel environment during the travel of the electric motor vehicle may affect the estimated power amount. For example, a travel at night requires the use of the headlamp, wipers may be needed when traveling in rain, and an air-conditioner or heater may be needed during extreme temperatures. The travel environment also includes traffic congestion along the route that may affect the amount of power needed to travel. The present disclosure may provide the electric motor vehicle with a travel environment information acquisition unit for acquiring data of a travel environment of the electric motor vehicle when the vehicle travels the planned travel route, and a second correction unit for correcting the estimated power amount based on the travel environment acquired by the travel environment information acquisition unit, thereby improving the accuracy of the estimated power amount.

Further, for example, the estimated power amount may change according to a use frequency of a vehicular device that is used according to the user preference, such as a vehicle audio system. The present disclosure may provide the electric motor vehicle with a vehicular device use frequency determination unit for determining a use frequency of a vehicular device that is used according to a user preference, and a third correction unit for correcting the estimated power amount based on a determination by the vehicular device use frequency determination unit, thereby improving the accuracy of the estimated power amount.

The charge control system of the present disclosure may include a charge station for charging the battery of the electric motor vehicle and an information center having the travel history database, where the information center is coupled to the charge station through a data communication unit. The charge station transmits a vehicle type, a current position and a destination of the electric motor vehicle to the information center. The information center may determine a planned travel route, which is recommended based on the received a current position and the destination of the electric motor vehicle. In addition, the information center may calculate the estimated power amount of the battery that may be needed for traveling along the planned travel route based on the travel history database. The planned travel route and the estimated power amount are transmitted to the charge station, where the charge station may control the charge of the battery based on the estimated power amount.

According to the above configuration, a planned travel route is calculated based on the current position of the electric motor vehicle and the destination, which are transmitted from the charge station, and the estimated power amount is also determined. The electric motor vehicle can receive the planned travel route as data transmitted from the information center, and can have an appropriate charge at the charge station.

In addition, the charge station may acquire the travel history data from the electric motor vehicle, which is collected by the electric motor vehicle, and transmits the travel history data to the information center. The information center receives the travel history data from the charge station, and stores the data in the travel history database. In such manner, the information center can collect the travel history data efficiently from many electric motor vehicles through the charge station.

Further, the charge station may be equipped with a weight measurement apparatus for detecting a weight of the electric motor vehicle to be charged. In such manner, the weight of the electric motor vehicle can be objectively and accurately measured.

In the present disclosure, the travel history database may be used for the following purposes, besides predicting the estimated power amount of the battery. For instance, a fuel mileage information disclosure unit for calculating and outputting an averaged power consumption amount for each of the vehicle types based on the travel history database. In such manner, according to the disclosure by the fuel mileage information disclosure unit about each of many vehicle types of the electric motor vehicle, a trend (i.e., merits and demerits) of the fuel mileage for each of the vehicle types becomes sufficiently clear. Such disclosure can be used by the user as an indication for determining the purchase/replacement or a rental of the vehicle.

Further, a driving characteristic determination unit for determining a driving characteristic of a user based on the travel history data regarding the user in the travel history database may be provided. In such manner, the user can objectively recognize if his/her own driving characteristics yields a good "fuel mileage," thereby leading to the improvement of the driving technique.

Further, an abnormality determination unit for determining and notifying the user of an abnormality of the electric motor vehicle, based on the travel history data of the user in the travel history database may be provided. In such manner, if the estimated power amount (i.e., an abnormally bad "fuel mileage") is abnormally bad, it may be determined as the abnormality (i.e., a trouble) of some kind in the vehicle. In such manner, the travel history database may be utilized in various ways for establishing the advantageous features of the charge control system.

What is claimed is:

1. A charge control system for charging a battery in an electric motor vehicle, the vehicle traveling by an electric motor is driven by the battery, the charging of the battery performed by an external power source, the system comprising:
    a travel history database accumulatively storing data of actual travel history from a plurality of electric motor vehicles, the data being information of a vehicle type, a travel route, and an estimated power amount for the travel route used by a motor of each of the plurality of electric motor vehicles;
    a route information acquisition unit acquiring information of a planned travel route toward a destination specified by a user;
    a power consumption estimation unit calculating an estimated power amount of the battery for the travel of the electric motor vehicle along the planned travel route, wherein the power consumption estimation unit determines the estimated power amount based on data in the travel history database from a same-type vehicle as the electric motor vehicle and a same travel route as the planned travel route;
    a charge control unit controlling a charge of the battery based on the estimated power amount;
    a weight determination unit determining a weight of the electric motor vehicle for when the electric motor vehicle travels the planned travel route; and
    a first correction unit correcting the estimated power amount based on the weight determined by the weight determination unit.

2. The charge control system of claim 1, wherein information of the travel routes in the travel history database is organized as a combination of a road link, a start node, 3. The charge control system of claim 1 further comprising:
    a travel environment information acquisition unit acquiring data of a travel environment of the electric motor vehicle for when the electric motor vehicle travels the planned travel route; and
    a second correction unit correcting the estimated power amount based on the travel environment acquired by the travel environment information acquisition unit.

4. The charge control system of claim 3 further comprising:
    a vehicular device use frequency determination unit determining a use frequency of a vehicular device being used according to a user preference; and
    a third correction unit correcting the estimated power amount based on the use frequency determined by the vehicular device use frequency determination unit.

5. The charge control system of claim 1 further comprising:
    a fuel mileage information disclosure unit calculating and outputting an averaged power consumption amount for vehicle types based on the data in the travel history database.

6. The charge control system of claim 1 further comprising:
    a driving characteristic determination unit determining a driving characteristic of a user based on the travel history data regarding the user in the travel history database.

7. The charge control system of claim 1 further comprising:
    an abnormality determination unit determining and notifying the user of an abnormality of the electric motor vehicle, based on the travel history data of the user in the travel history database.

8. A charge control system for charging a battery in an electric motor vehicle, the vehicle traveling by an electric motor is driven by the battery, the charging of the battery performed by an external power source, the system comprising:
- a travel history database accumulatively storing data of actual travel history from a plurality of electric motor vehicles, the data being information of a vehicle type, a travel route, and an estimated power amount for the travel route;
- a route information acquisition unit acquiring information of a planned travel route toward a destination specified by a user;
- a power consumption estimation unit calculating an estimated power amount of the battery for the travel of the electric motor vehicle along the planned travel route, wherein the power consumption estimation unit determines the estimated power amount based on data in the travel history database from a same-type vehicle as the electric motor vehicle and a same travel route as the planned travel route;
- a charge control unit controlling a charge of the battery based on the estimated power amount;
- a charge station charging the battery of the electric motor vehicle, the charge control unit being part of the charge station; and
- an information center having the travel history database, the route information acquisition unit, and the power consumption estimation unit, the information center being coupled to the charge station through a data communication unit, wherein the charge station transmits, to the information center, a vehicle type, a current position, and a destination of the electric motor vehicle to be charged, the information center determines a planned travel route based on the current position and the destination of the electric motor vehicle and determines the estimated power amount of the battery for traveling along the planned travel route based on the travel history database, and the information center transmits the planned travel route and the estimated power amount to the charge station, and the charge station controls the charge of the battery based on the estimated power amount.

9. The charge control system of claim 8, wherein the charge station acquires the travel history data from the electric motor vehicle, and transmits the travel history data to the information center, and the information center stores the travel history data from the charge station in the travel history database.

10. The charge control system of claim 8, wherein the charge station is equipped with a weight measurement apparatus for detecting a weight of the electric motor vehicle to be charged.

11. The charge control system of claim 1 further comprising:
- a travel environment information acquisition unit acquiring data of a travel environment of the electric motor vehicle for when the electric motor vehicle travels the planned travel route; and
- an estimated-power-correction unit correcting the estimated power amount based on the travel environment acquired by the travel environment information acquisition unit.

12. The charge control system of claim 1 further comprising:
- a vehicular device use frequency determination unit determining a use frequency of a vehicular device being used according to a user preference; and
- an estimated-power-correction unit correcting the estimated power amount based on the use frequency determined by the vehicular device use frequency determination unit.

* * * * *